United States Patent [19]

Hinz

[11] Patent Number: 4,827,947
[45] Date of Patent: May 9, 1989

[54] METHOD OF AND APPARATUS FOR ROLLING AND SIMULTANEOUS RADIATION TREATMENT OF ROD-SHAPED ARTICLES OF THE TOBACCO PROCESSING INDUSTRY

[75] Inventor: Werner Hinz, Lauenburg, Fed. Rep. of Germany

[73] Assignee: Körber AG, Hamburg, Fed. Rep. of Germany

[21] Appl. No.: 158,306

[22] Filed: Feb. 19, 1988

[30] Foreign Application Priority Data

Feb. 21, 1987 [DE] Fed. Rep. of Germany ....... 3705627

[51] Int. Cl.⁴ ............................................. A24C 1/38
[52] U.S. Cl. ................................................ 131/281
[58] Field of Search .................. 131/94, 281; 198/379; 209/536, 538

[56] References Cited

U.S. PATENT DOCUMENTS

| | | | |
|---|---|---|---|
| 4,121,595 | 10/1978 | Heitmann et al. | 131/21 R |
| 4,240,448 | 12/1980 | Heitmann et al. | 131/21 R |
| 4,249,545 | 2/1981 | Gretz et al. | 131/21 R |
| 4,277,678 | 7/1981 | Wahle et al. | 250/223 R |
| 4,281,670 | 8/1981 | Heitmann et al. | 131/281 |

FOREIGN PATENT DOCUMENTS

2157540 10/1985 United Kingdom ................ 131/281

Primary Examiner—V. Millin
Assistant Examiner—Robert W. Bahr
Attorney, Agent, or Firm—Peter K. Kontler

[57] ABSTRACT

Successive filter cigarettes of unit length or multiple unit length are transported sidways on a first drum-shaped conveyor which cooperates in a filter tipping machine with a second drum-shaped conveyor to rotate successive cigarettes about their respective axes so that the rotating cigarettes come to a temporary halt in a predetermined portion of their path. Such cigarettes are acted upon the two or more laser beams or light beams which are equidistant from and angularly offset relative to each other in the circumferential direction of the cigarette which rotates about its axis so that a circumferentially complete portion of the rotating cigarette is acted upon by radiation while the cigarette completes a fraction of one revolution, namely an angle of 360 degrees divided by the number of beams. The first conveyor has peripheral advancing surfaces for individual cigarettes, and the length of each advancing surface in the circumferential direction of the first conveyor equals the circumferential length of a cigarette divided by the number of beams. The mutual spacing of cigarettes on the first conveyor is less than the mutual spacing of cigarettes on a conveyor which feeds successive untreated cigarettes to the first conveyor ahead of the rolling station and on a conveyor which receives successive treated cigarettes from the first conveyor downstream of the rolling station.

18 Claims, 2 Drawing Sheets

METHOD OF AND APPARATUS FOR ROLLING AND SIMULTANEOUS RADIATION TREATMENT OF ROD-SHAPED ARTICLES OF THE TOBACCO PROCESSING INDUSTRY

BACKGROUND OF THE INVENTION

The present invention relates to improvements in methods of in and apparatus for treating rod-shaped articles of the tobacco processing industry, such as plain or filter cigarettes, cigars, cigarillos, filter rod sections and the like. More particularly, the invention relates to improvements in methods of and in apparatus for rolling and simultaneously treating rod-shaped articles of the tobacco processing industry in filter tipping and/or other tobacco processing machines. Still more particularly, the invention relates to improvements in methods of and in apparatus for treating rod-shaped articles which are transported sideways (i.e., substantially at right angles to their respective axes) along a predetermined path and are rotated about their respective axes in selected portions of the path.

It is well known to increase the permeability of tubular wrappers of rod-shaped articles which contain natural, reconstituted and/or artificial tobacco and/or fibrous or other filter material while the articles are caused to advance along a predetermined path in such a way that their axes extend at right angles to the direction of movement. Such perforating operation is normally carried out by a laser serving to direct a coherent beam of radiation against the wrapper of the article which is caused to rotate about its axis so that the coherent beam forms in the wrapper at least one ring of perforations while the article completes a full revolution. The means for rotating the articles about their respective axes can include a first rotary drum-shaped conveyor which transports the articles serially along the predetermined path, a second rotary conveyor which is adjacent a selected portion of the path and is rotated in the same direction as the first conveyor so that circumferentially spaced-apart portions of the second conveyor engage successive articles in the selected portion of the path and cause such articles to reduce their forward speed along the path, preferably to zero, while the articles turn about their own axes. Reference may be had to commonly owned U.S. Pat. No. 4,240,448 to Heitmann which discloses an apparatus for increasing the permeability of wrapping material for rod-shaped smokers' products. The laser beam is pulsated at a selected frequency so as to provide the wrappers of successively treated articles with spaced apart perforations in the wrapper portions which surround the tobacco-containing parts or the filter mouthpieces of the respective articles. The speed at which the first conveyor of the patented apparatus transports successive rod-shaped articles toward as well as from the rolling or treating zone equals the speed of articles on the neighboring conveyors, namely on the conveyor which feeds a succession of untreated articles to the first conveyor and on the conveyor which receives successive (treated) articles from the first conveyor. It has been found that the patented apparatus can perforate the wrappers of successive rod-shaped articles of the tobacco processing industry with a high degree of accuracy and at a high frequency such as is necessary in a filter tipping machine which is designed to turn out many thousands of filter cigarettes per minute. Each treatment necessitates at least one full revolution of the respective article about its own axis.

Commonly owned U.S. Pat. No. 4,277,678 to Wahle et al. discloses a modified apparatus wherein rod-shaped articles of the tobacco processing industry, particularly filter cigarettes in a filter tipping machine, are rotated about their respective axes during travel past a testing or monitoring station where the wrappers of such articles reflect radiation for the purpose of ascertaining the condition of the wrappers. The reflected radiation is directed against one or more photoelectronic detectors serving to generate signals which are indicative of the condition of tubular wrappers forming part of the tested articles. Here, again, each article completes at least one full revolution during monitoring of its wrapper in a selected portion of the path along which the articles advance sideways and wherein they are rotated about their own axes.

OBJECTS AND SUMMARY OF THE INVENTION

An object object of the invention is to provide a novel and improved apparatus which can be used for the treatment of successive rod-shaped articles of the tobacco processing industry while the articles rotate about their own axes.

Another object of the invention is to provide the apparatus with novel and improved means for advancing the articles along a predetermined path toward, through and beyond the treating and rolling zone.

A further object of the invention is to provide the apparatus with novel and improved means for treating the rotating rod-shaped articles in the rolling zone.

An additional object of the invention is to provide the apparatus with novel and improved means for directing radiation against articles which rotate about their respective axes.

Still another object of the invention is to provide the apparatus with novel and improved means for perforating the wrappers of rotating rod-shaped articles of the tobacco processing industry.

A further object of the invention is to provide the apparatus with novel and improved means for monitoring the condition of wrappers of rod-shaped articles of the tobacco processing industry while the articles rotate about their own axes.

A further object of the invention is to provide a novel and improved method of treating rod-shaped articles of the tobacco processing industry while the articles are caused to rotate about their own axes.

An additional object of the invention is to provide a method of treating the rod-shaped articles gently so that their wrappers are not likely to be smudged, pierced, torn and/or otherwise damaged during transport toward or away from the treating station as well as at the treating station proper.

An additional object of the invention is to provide an apparatus which can treat rotating rod-shaped articles of the tobacco processing industry at a frequency much higher than that achievable in conventional apparatus of such character.

Another object of the invention is to provide a machine for the production and/or processing of rod-shaped articles of the tobacco processing industry which embodies the above outlined apparatus.

Another object of the invention is to provide a novel and improved filter tipping machine.

One feature of the present invention resides in the provision of an apparatus for treating rod-shaped articles of the tobacco processing industry. The apparatus comprises means for conveying the articles seriatim sideways along a predetermined path, means for decelerating successive articles in a predetermined portion of the path and for rotating the decelerated articles about their respective axes, and treating means including at least two radiation directing means disposed in the region of the predetermined portion of the path and each arranged to focus a beam of radiation upon the rotating decelerated article. The radiation directing means are spaced apart from each other in the circumferential direction of the article in the predetermined portion of the path.

In accordance with a presently preferred embodiment of the apparatus, the decelerating means includes means for interrupting the sidewise movement of articles in the predetermined portion of the path. The conveying means preferably comprises a first rotary conveyor having peripheral article supporting surfaces, and means for rotating the first conveyor to advance the supporting surfaces along the path in a predetermined direction. The decelerating means of such apparatus can comprise a second rotary conveyor having peripheral counterrolling surfaces, and means for rotating the second conveyor in the predetermined direction so as to advance the counterrolling surfaces along a second path a portion of which is adjacent the predetermined portion of the predetermined path so that the articles which advance with successive supporting surfaces along the predetermined portion of the predetermined path are acted upon by successive counterrolling surfaces and are thus caused to rotate about their respective axes.

The treating means preferably comprises n substantially equidistant radiation directing means which surround the predetermined portion of the predetermined path so that a circumferentially complete portion of the periphery of an article in the predetermined portion of the predetermined path has already been acted upon by radiation when such article completes a fraction of a full revolution, namely an angular movement through 360/n degrees. If each article has a circumferential length m, the conveying means preferably comprises a rotary (first) conveyor having at its periphery a plurality of article supporting and advancing surfaces or facets each of a length (as considered in the circumferential direction of the conveyor) which equals or approximates m/n. Such apparatus can further comprise means for feeding discrete rod-shaped articles to successive advancing surfaces of the first conveyor, and the feeding means includes equidistant article receiving devices (for example in the form of axially parallel flutes at the periphery of a rotary drum-shaped conveyor). The mutual spacing of such receiving devices on the feeding means exceeds the mutual spacing of articles on the first conveyor. The ratio of the mutual spacing of receiving devices on the feeding means to the mutual spacing of articles on the first conveyor is a function of m/n. The apparatus can further comprise means for receiving discrete rod-shaped articles from successive advancing surfaces, and such receiving means includes equidistant article receiving devices (for example in the form of axially parallel flutes at the periphery of a rotary drum-shaped conveyor). The mutual spacing of receiving devices on the article receiving means exceeds the mutual spacing of articles on the first conveyor. The ratio of mutual spacing of receiving devices on the receiving means to the mutual spacing of articles on the first conveyor is a function of m/n.

The feeding means can include first additional conveying means, and the receiving means can include second additional conveying means. As explained above, the mutual spacing of articles on the first conveyor (which has the advancing surfaces) can be less than the mutual spacing of articles on the first and/or second additional conveying means. Such arrangement contributes to the output of the apparatus and of the machine which embodies the apparatus. The ratio of the speed of the first conveyor to the speed of the first and/or second additional conveying means is preferably a function of m/n.

As a rule, the apparatus of the present invention will be utilized for the treatment of rod-shaped articles of the tobacco processing industry each of which has a tubular wrapper made of cigarette paper, artificial cork or other suitable wrapping material. The treating means of such apparatus can further comprise at least one source of coherent radiation and means for effecting the propagation of such radiation from the source to the aforementioned directing means so that the beams of coherent radiation which are directed against the articles in the predetermined portion of the predetermined path are caused to perforate the wrappers of the rod-shaped articles while the articles rotate about their own axes. Each beam can constitute a laser beam.

Alternatively, the radiation can constitute electromagnetic radiation (light) which is reflected by the articles in the predetermined portion of the predetermined path. The treating means of such apparatus preferably further includes means for monitoring the characteristics of reflected radiation. For example, each directing means can comprise a battery of sources of electromagnetic radiation and the treating means can comprise a battery of monitoring means for each battery of radiation sources. Each monitoring means can constitute a photoelectronic transducer. Radiation which is reflected by the wrapper of the article that rotates in the predetermined portion of the predetermined path is indicative of the condition of such wrapper, and the monitoring means of such apparatus includes means for generating signals denoting the intensity of reflected radiation. The treating means of such apparatus preferably further comprises means for evaluating and processing signals from the signal generating means so that the processed signals are indicative of the condition of the respective wrappers.

The (first) conveyor which is provided with advancing surfaces, the associated second conveyor which cooperates with the first conveyor to rotate the articles about their respective axes, the aforementioned feeding means and the aforementioned receiving means preferably constitute component parts of a filter tipping machine.

Another feature of the invention resides in the provision of a method of treating rod-shaped articles of the tobacco processing industry, particularly in a filter tipping machine. The method comprises the steps of conveying the articles seriatim sideways along a predetermined path, decelerating successive articles in a predetermined portion of the path and rotating the decelerated articles about their respective axes, and treating successive articles in the predetermined portion of the path, including directing upon the article in such portion of the path at least two beams of radiation from locations which are angularly offset relative to each other in the circumferential direction of the article. The decelerating step can include interrupting the sidewise movement of successive articles in the predetermined portion of the path, and the treating step can include directing upon the article in the predetermined portion of the path n beams of radiation. The beams are at least substantially equidistant from each other in the circumferential direction of the article so that a circumferentially complete portion of an article is acted upon by the n beams when such article completes an angular movement which is a fraction of a full revolution, namely 360/n degrees. The method can further comprise the steps of feeding successive articles into the predetermined path ahead of the predetermined portion of such path at a first speed, removing successive articles from the path downstream of the predetermined portion of the path at a second speed, and advancing the articles along the path toward and away from the predetermined portion of the path at a third speed which is preferably less than at least one of the first and second speeds.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
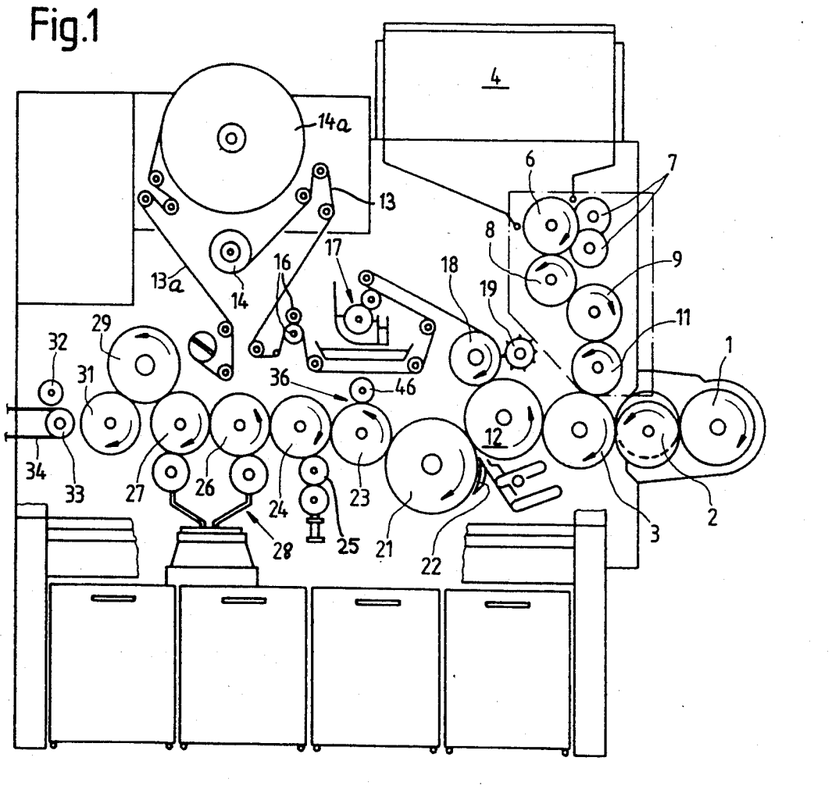
FIG. 1 is a schematic front elevational view of a filter tipping machine embodying an apparatus which is constructed and assembled in accordance with one embodiment of the present invention and serves to provide the wrappers of successive filter cigarettes with annuli of perforations.

FIG. 1 shows a filter tipping machine which embodies one form of the improved apparatus. The filter tipping machine comprises a rotary drum-shaped conveyor 1 which receives two rows of plain cigarettes of unit length from a cigarette rod making machine (for example, of the type known as PROTOS which is distributed by the assignee of the present application). The plain cigarettes of one row are staggered with reference to the cigarettes of the other row, and successive cigarettes of the two rows are transferred into successive flutes of two aligning conveyors 2 in the form of drums which rotate at different speeds and/or transport the respective plain cigarettes through different distances so that they deposit pairs of coaxially axially spaced apart plain cigarettes into successive flutes at the periphery of a drum-shaped assembly conveyor 3. Filter plugs of six times unit length are stored in a magazine 4 and are discharged into successive peripheral flutes of a drum-shaped cutting conveyor 6 cooperating with two axially staggered rotary disc-shaped knives 7 to subdivide each filter plug of six times unit length into three coaxial filter plugs or mouthpieces of double unit length. A composite staggering conveyor 8 with three discs or drums is provided to stagger the originally coaxial filter plugs of double unit length in the circumferential direction so as to form three rows wherein the filter plugs of each row are staggered circumferentially relative to the filter plugs in the other two rows. Such filter plugs are thereupon transferred onto a shuffling conveyor 9 wherein two of the three rows of filter plugs are moved axially so that the filter plugs in the peripheral flutes of the shuffling conveyor 9 are converted into a single row wherein each preceding filter plug is in accurate alignment with the next-following as well as with the preceding filter plug. Successive filter plugs of the thus obtained single row are transferred into successive flutes of a rotary drum-shaped accelerating conveyor 11 which transfers successive filter plugs into the spaces between pairs of coaxial plain cigarettes of unit length in successive peripheral flutes of the assembly conveyor 3. In this manner, each flute of the assembly conveyor 3 contains a group consisting of three coaxial rod-shaped components, namely two axially spaced apart plain cigarettes of unit length and a filter plug or mouthpiece of double unit length between them. The groups advance past suitable condensing means, such as two stationary cams which move at least one of the plain cigarettes axially toward the other plain cigarette in order to ensure that the inner ends of the plain cigarettes abut the adjacent ends of the filter plug between them, before the thus condensed groups are transferred into successive flutes of a rotary drum-shaped transfer conveyor 12.

The frame of the filter tipping machine supports a bobbin 14 constituting a source of supply of a continuous web 13 of tipping paper which is withdrawn from the bobbin by a pair of advancing rolls 16, at least one of which is driven, and successive increments of one side of the advancing web 13 are coated with adhesive during travel along a conventional paster 17. The leader of the web 13 is attracted to the periphery of a rotary suction drum 18 constituting an anvil for the knives at the periphery of a drum-shaped cutter 19. The knives of the cutter 19 cooperate with the suction drum 18 to divide the leader of the web 13 into a succession of discrete adhesive-coated uniting bands which are attached to successive groups of rod-shaped articles in the flutes of the transfer conveyor 12 in such a way that each uniting band adheres substantially tangentially to the respective filter plug of double unit length as well as to the adjacent inner end portions of the respective plain cigarettes of unit length.

The frame of the filter tipping machine further supports a fresh or spare bobbin 14a for a fresh web 13a which is spliced to the running web 13 before the supply of tipping paper in the bobbin 14 is exhausted. The mechanism which performs the splicing operation is of conventional design and need not be described here.

The groups of rod-shaped articles which are held in the flutes of the transfer conveyor 12, and each of which carries an adhesive-coated uniting band, are delivered into the peripheral flutes of a draping conveyor 21 in the form of a rotary drum which cooperates with an adjustable draping member 22 to cause successive groups to rotate about their respective axes so that each uniting band is converted into a tube sealingly surrounding the respective filter plug of double unit length as well as the adjacent inner end portions of the respective plain cigarettes of unit length. In other words, the draping drum 21 cooperates with the draping member 22 to convert successive groups of coaxial rod-shaped articles into filter cigarettes 41 (see FIG. 2) of double unit length.

Successive filter cigarettes 41 of double unit length are attracted into flute-like article receiving devices 21a of the draping conveyor 21 by suction (see the right-hand portion of FIG. 2) and are advanced to a transfer station between the conveyor 21 and a rotary drum-shaped rolling conveyor (first conveyor) 23 which forms part of the improved apparatus 36 and cooperates with a second rotary drum-shaped conveyor 46 in a manner to be described in connection with FIG. 2. The purpose of the apparatus 36 is to provide the wrappers of successive filter cigarettes 41 of double unit length with two rings of perforations which serve to permit atmospheric air to penetrate into the columns of tobacco smoke in discrete filter cigarettes 41a of unit length (see FIG. 3) when such filter cigarettes are lighted by a smoker. If desired, the rolling conveyor 23 can be heated so as to promote setting of the adhesive which bonds the convoluted uniting bands to the respective filter plugs of double unit length and to the adjacent end portions of plain cigarettes of unit length.

Successive filter cigarettes 41 of double unit length, each of which is provided with two rings of perforations, are thereupon advanced to a second transfer station (shown also in the left-hand portion of FIG. 2) where they are delivered into successive flute-like article receiving devices 24a of a cutting conveyor 24 in the form of a rotary drum cooperating with a rotary disc-shaped knife 25 to subdivide each filter cigarette 41 of double unit length into two coaxial filter cigarettes 41a of unit length. At the same time, defective filter cigarettes of unit length are permitted to leave the conveyor 24 by gravity or are expelled from such conveyor in any other suitable way. For example, the conveyor 24 can be designed to permit gravitational descent of those filter cigarettes 41a which lack tobacco-containing portions or filter plugs of unit length.

The conveyor 24 delivers two rows of filter cigarettes 41a of unit length into successive flutes of a rotary drum-shaped conveyor 26 forming part of a turn-around device 28 of conventional design. Such turn-around devices are used in filter tipping machines which are known as MAX and MAX S (both distributed by the assignee of the present application). Filter cigarettes 41a of one row are turned by the turn-around device 28 end-to-end before they enter alternate peripheral flutes of a drum-shaped conveyor 27. This conveyor also receives non-inverted filter cigarettes 41a directly from the conveyor 26 in such a way that it forms a single row of filter cigarettes 41a wherein all of the filter plugs face in the same direction. Successive filter cigarettes 41a of the single row are transferred onto a testing conveyor 29 which is provided with means for testing the condition of the wrappers of successive filter cigarettes 41a in a manner not forming part of the present invention before the cigarettes are transferred onto a further drum-shaped conveyor 31 having means for testing the tobacco-containing heads of the filter cigarettes and for segregating defective filter cigarettes from satisfactory cigarettes, for example, with a jet of compressed air in a manner which is customary in filter tipping machines. Satisfactory filter cigarettes 41a of unit length are transferred onto the upper reach of an endless take-off belt 34 which is trained over pulleys 33 (only one shown) and cooperates with a braking conveyor 32 to decelerate successive filter cigarettes 41a and to advance them to storage, to a packing machine or to another destination. If desired, the belt 34 can constitute one component of a means for converting satisfactory filter cigarettes 41a of unit length into a mass flow of such articles wherein the articles form several layers. The mass flow is then delivered to the magazine of a packing machine or into a reservoir, for example, into a reservoir of the type known as RESY which is distributed by the assignee of the present application.

Figures 2, 4:
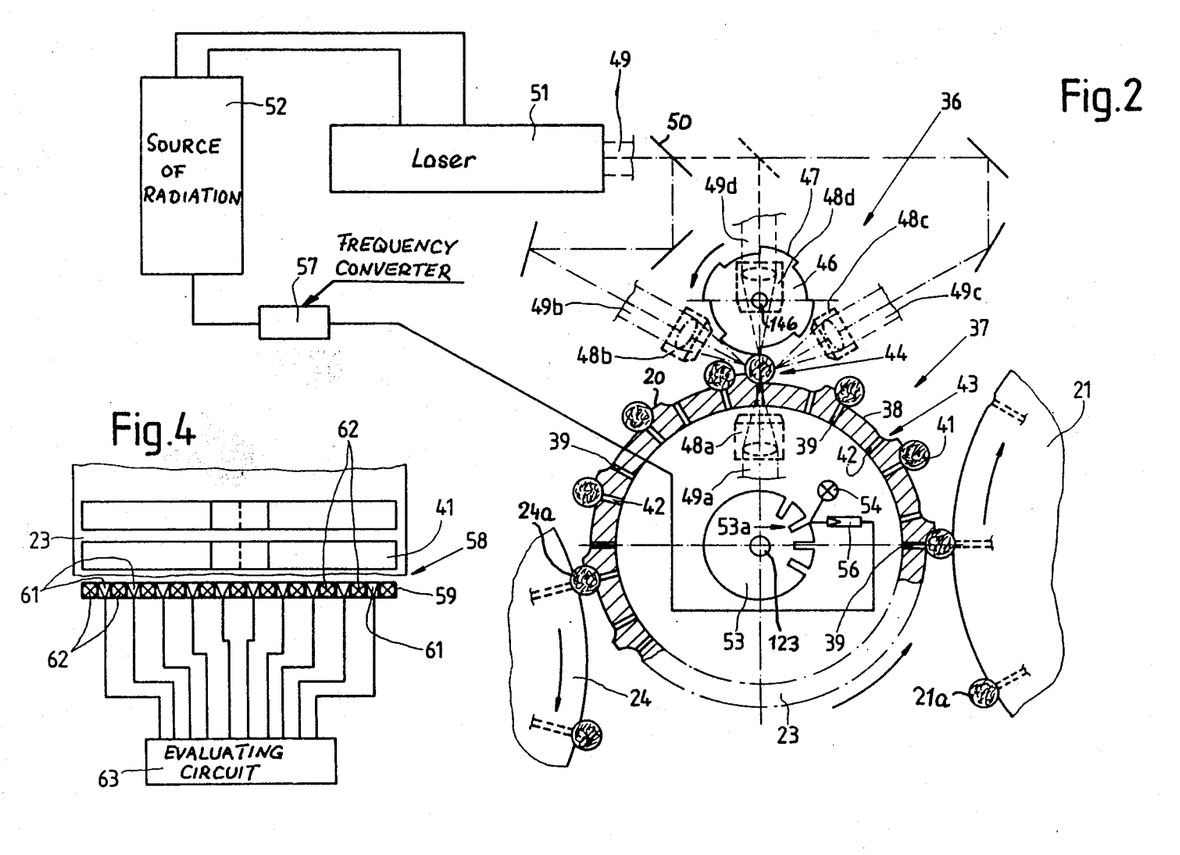
FIG. 2 is an enlarged view of a detail of the apparatus of FIG. 1, further showing the source of radiation and the means for pulsing the radiation which is propagated from the source to discrete radiation directing means of the apparatus.
FIG. 4 is a schematic side elevational view of a portion of a further apparatus which is utilized to monitor the condition of tubular wrappers on successive rod-shaped articles of the tobacco processing industry.

The apparatus 36 which includes the rolling (first) conveyor 23 and the second conveyor 46 is shown in greater detail in FIG. 2 which further shows a portion of the draping conveyor 21 constituting a first additional conveyor of the apparatus 36 and serving as a means for feeding a succession of filter cigarettes 41 of double unit length to successive peripheral article advancing and supporting surfaces or facets 38 of the conveyor 23. FIG. 2 further shows a portion of the cutting conveyor 24 which constitutes a means for receiving perforated filter cigarettes 41 of double unit length from the conveyor 23 downstream of a rolling station 44 where the conveyors 23 and 46 cooperate to rotate successive filter cigarettes 41 of double unit length about their respective axes so that such cigarettes are temporarily decelerated (preferably to zero speed) as concerns their travel from the transfer station between the conveyors 21, 23 to the transfer station between the conveyors 23, 24. The elongated path along which the conveyor 23 advances successive filter cigarettes 41 of double unit length sideways (namely at right angles to the axes of such cigarettes) is an arcuate path which extends along an arc of a little more than 180°. The rolling station 44 occupies a predetermined portion of the arcuate path, namely at the apex of the conveyor 23.

The aforementioned advancing surfaces or facets 38 are disposed at the bottoms of relatively shallow axially parallel recesses 37 which are provided in the periphery of the conveyor 23 and each of which is flanked by two axially parallel ribs 20 of the conveyor 23. The wall of the conveyor 23 is formed with suction ports 39 and 42 which serve to attract filter cigarettes 41 to the respective advancing surfaces 38 during certain stages of travel of cigarettes with the conveyor 23. As shown in FIG. 2, the flutes 39 serve to attract filter cigarettes 41 immediately after such cigarettes are transferred from the conveyor 21, and the flutes 42 attract the cigarettes 41 downstream of the rolling station 44 on their way toward the transfer station between the conveyors 23 and 24. In other words, the suction ports 39 are located at the upstream ends and the suction ports 42 are located at the downstream or rear ends of the respective advancing surfaces 38. The suction ports 42 communicate with relatively shallow flutes 43 which are provided in the rearmost portions of the respective advancing surfaces 38 and in which the freshly treated (perforated) cigarettes 41 come to rest on their way from the rolling station 44 to the transfer station between the conveyors 23 and 24. The manner in which the suction ports 39 and 42 are connectable to a suitable suction generating device, such as a suction fan, is well known in the art of filter tipping machines and need not be described here. It suffices to say that the cigarettes 41 are attracted by air which flows or tends to flow into the flutes 39 on their way from the transfer station between the conveyors 21, 23 to the rolling station 44, and that the freshly treated cigarettes 41 are attracted by air which flows or tends to flow into the flutes 42 during travel from the rolling station 44 to the transfer station between the conveyors 23 and 24.

The second conveyor 46 of the apparatus 36 is provided with four equidistant circumferentially spaced apart raised portions or lobes each of which has a convex counterrolling surface 47. Successive surfaces 47 cooperate with successive advancing surfaces 38 of the conveyor 23 to roll successive filter cigarettes 41 of double unit length about the axes of such cigarettes at the rolling station 44. As mentioned above, the conveyor 46 constitutes a means for decelerating successive cigarettes 41 to zero speed while its counterrolling surfaces 47 cooperate with the surfaces 38 of the conveyor 23 so that each cigarette which reaches the rolling station simply rotates about its axis but without moving forwardly in a direction toward the transfer station between the conveyors 23, 24 until it is engaged by the oncoming rib 20 to be advanced beyond the rolling station 44 and to thereupon share the movement of the conveyor 23. The conveyor 23 is driven by a shaft 123 so as to rotate in a counterclockwise direction, as seen in FIG. 2. A shaft 146 is used to drive the conveyor 46 in a counterclockwise direction so that the direction of movement of successive surfaces 47 at the rolling station 44 is counter to the direction of movement of successive advancing surfaces 38. Such movements of the surfaces 38, 47 in opposite directions affect a rolling of the cigarettes 41 about the axes of the cigarettes during treatment at the station 44. The speeds of the conveyors 23, 46 are related to (synchronized with) each other in such a way that the decelerating action of successive counterrolling surfaces 47 is complete, i.e., so that each cigarette 41 which reaches the rolling station 44 merely rotates about its own axis but does not move toward the transfer station between the conveyors 23, 24 while the respective advancing surface 38 moves relative to such cigarette until the oncoming rib 20 engages the rotating cigarette 41 and pushes it beyond the rolling station 44. Save for the extent of rotation of cigarettes 41 at the rolling station 44, the just described mode of rolling the cigarettes is analogous to that described in the aforementioned U.S. Pat. Nos. 4,240,448 and 4,277,678. The disclosure of each of these patents is incorporated herein by reference.

In accordance with a feature of the invention, the means for treating successive filter cigarettes 41 of double unit length at the rolling station 44 comprises three equidistant radiation directing units (hereinafter called heads) 48a, 48b and 48c which are uniformly distributed in the circumferential direction of the cigarette 41 rotating at the rolling station 44. In other words, the heads 48a-48c are disposed around that (predetermined) portion of the arcuate path for successive cigarettes 41 wherein the cigarettes are caused to come to a halt (as far as their advancement toward the conveyor 24 is concerned) and rotate about their own axes. Each of the heads 48a-48c has suitable means for focusing the respective beam 49a, 49b, 49c of radiation upon the tubular wrapper of the cigarette 41 at the rolling station. The beams 49a-49c are laser beams which are pulsated so that they cooperate to form in the wrapper of the cigarette 41 at the rolling station 44 a rig of perforations extending along the entire circumference of the cigarette. To this end, it is merely necessary to rotate the cigarette 41 at the station 44 through an angle of 360/n degrees wherein n is the number of radiation directing or focusing heads. In other words, instead of being required to turn through an angle of 360° or more, each cigarette 41 which reaches the rolling station 44 must turn only through 120° to be provided with a complete ring of perforations if the beams 49a-49c impinge upon the wrapper at 44 in a common plane. The beams 49a-49c are obtained by splitting a single laser beam 49 which is emitted by a laser 51. The means for dividing the single beam 49 into several beams (49a-49c) which propagate themselves to the respective heads 48a-48c comprises or can comprise a plurality of partially transmitting mirrors 50 which are indicated in FIG. 2 by solid lines. It is preferred to divide the laser beam 49 into three substantially or exactly equal laser beams 49a-49c so as to ensure that the intensity of coherent radiation which is directed by the head 48a is the same as that which is directed by the head 48b or 48c. The manner of dividing a single laser beam into two or more equal or different laser beams is well known in the art and is disclosed in numerous patents of the assignee of the present application. Reference may be had, for example, to commonly owned U.S. Pat. No. 4,121,595 granted to Heitmann et al.

The head 48a is installed in the interior of the drum-shaped conveyor 23 which has suitable windows for penetration of the beam 49a into the material of the tubular wrapper forming part of the cigarette 41 rotating at the rolling station 44. The arrangement is such that the beam 49a is admitted into the interior of the conveyor 23 in parallelism with the axis of the drive means 123 and is then deflected radially outwardly into the radiation directing head 48a. A similar conveyor is described and shown in commonly owned U.S. Pat. Nos. 4,121,595 and 4,281,670 to Heitmann et al.

In order to pulsate the beams 49a-49c, the apparatus 36 further comprises an energy source 52 which is connected to the laser 51, and a frequency converter 57 which is connected to the energy source 52 and transmits thereto impulses at a frequency determined by a disc-shaped timing pulse generator 53 having pulse generating portions in the form of prongs 53a. A light source 54 is provided to direct a light beam against the portions 53a as the timing pulse generator 53 rotates with the shaft 123, and reflected light is caused to impinge upon a photoelectronic transducer 56 which transmits timing pulses to the frequency converter 57. The frequency converter 57 further receives signals denoting the diameters of cigarettes 41, the desired number of perforations which are to be provided in the wrappers of successive cigarettes 41, and the desired duration of impulses of the laser beam 49 so as to determine the size of perforations. This ensures that the beam 49 is pulsed at a frequency which is necessary to provide each cigarette 41 with a row or ring of perforations so as to allow penetration of optimum quantities of atmospheric air into the respective filter cigarette 41 of double unit length.

It is clear that the apparatus 36 will normally comprise two lasers 51 and two sets of radiation directing heads so that each cigarette 41 of double unit length can be provided with two rings of perforations, one in each of its filter cigarettes 41a of unit length. The timing pulse generator 53 can be similar to those described in commonly owned U.S. Pat. No. 4,249,545 granted to Gretz et al. As mentioned above the disclosures of all patents which are mentioned in this specification are incorporated herein by reference.

Since the wrappers of successive cigarettes 41 are simultaneously treated by three radiation directing heads 48a–48c, it is only necessary to turn each cigarette through an angle of 120° in order to provide it with a complete ring of perforations (it is assumed here that the beams 49a–49c are coplanar). Therefore, the length of advancing surfaces 38 on the conveyor 23 (as measured in the circumferential direction of this conveyor) is less than necessary in conventional apparatus wherein each cigarette must be turned through 360°. The length of each advancing surface 38 equals or approximates one-third of the circumferential length m of a cigarette 41. In other words, the length of each surface 38 in the circumferential direction of the conveyor 23 equals m/n wherein m is the circumferential length of a single cigarette 41 and n is the number of radiation directing heads 48a–48c. A cigarette 41 which is to advance from the range of the respective suction port 39 into the range of the respective suction port 42 turns through one-third of one full revolution so that the conveyor 23 can be rotated at a speed which is much less than the speed of the conveyors 21 and 24. As shown in FIG. 2, the pitch of the conveyor 21 (as well as of the conveyor 24) is greater than the pitch of the conveyor 23. In other words, the mutual spacing of centers of successive ribs 20 or the mutual spacing of successive suction ports 39 or 42 is a fraction of the mutual spacing of flutes 21a in the periphery of the conveyor 21 or the mutual spacing of flutes 24a in the periphery of the conveyor 24. The flutes 21a and/or 24a can be replaced by other suitable article receiving and retaining devices as is well known in the field of manipulating and conveying rod-shaped articles of the tobacco processing industry. The ratio of mutual spacing of the flutes 21a or 24a to the mutual spacing of suction ports 39 or 42 is a function of the aforementioned ratio m/n.

An important advantage of the apparatus 36 is that the speed of the conveyor 23 can be less than the speed of the conveyors 21 and 24. This reduces the likelihood of escape of tobacco particles at the ends of the filter cigarettes 41, smudging of the wrappers of such cigarettes, tearing of the wrappers and/or other damage. Alternatively, if the peripheral speed of the conveyor 23 is to match that of presently used rolling conveyors which cooperate with a single radiation directing head, the improved apparatus can be used to turn out larger numbers of treated filter cigarettes 41 per unit of time than heretofore known apparatus. In other words, the speed of the conveyors 21 and 24 can be greatly increased if the conveyor 23 is to rotate at the speed which equals that of the illustrated conveyors 21 and 24. Thus, the apparatus 36 reduces the likelihood of damage to or defacing of cigarettes 41 and/or allows the filter tipping machine to turn out larger numbers of filter cigarettes per unit of time.

FIG. 4 shows a portion of a modified apparatus, and more particularly one radiation directing unit 58 of such modified apparatus. The illustrated unit 58 comprises a row 59 of alternating light sources 62 and photoelectronic detectors 61. The arrangement is such that the light sources 62 direct beams of light against selected portions of the tubular wrapper of an article 41 rotating at the rolling station of the apparatus 36, and the reflected light impinges upon the associated detectors 61 which transmit appropriate electric signals to an evaluating and processing circuit 63. The row 59 of alternating light sources 62 and detectors 61 extends in parallelism with the article 41 at the rolling station. Each signal from a detector 61 to the evaluating circuit 63 is indicative of the condition of the respective portion of the tubular wrapper at the rolling station 44. The circuit 63 evaluates all of the signals and transmits signals denoting the condition of the entire wrapper at the rolling station. Such signals can be used to initiate ejection of the corresponding defective cigarettes, for example when the two filter cigarettes 41a of unit length which are obtained from a defective cigarette 41 reach the conveyor 31 of FIG. 1. The apparatus which employs the radiation directing unit 58 is equipped with two or more such units, depending on the desired extent of angular movement of an article 41 at the rolling station. Thus, if the articles are to turn through angles of 120°, the apparatus will comprise three radiation directing units 58. Alternatively, the apparatus will employ only two radiation directing units, which are located diametrically opposite each other (see the radiation directing heads 48a and 48d in FIG. 2) if each article 41 is to turn through an angle of 180°. The same applies for the radiation directing heads which are shown in FIG. 2. In other words, if the dimensions of the surfaces 38 and 47 are selected with a view to rotate each article 41 through an angle of 180° while the wrapper of such article is being perforated by two radiation directing heads, the apparatus 36 o FIG. 2 will comprise two heads (48a and 48d) which are disposed diametrically opposite each other. The other radiation directing heads (48b and 48c) are then deactivated or omitted and the single beam 49 is divided into only two smaller beams 49a and 49d. By the same token, the number of radiation directing heads can be increased to four or more, depending upon the desired angular displacement of successive articles 41 at the rolling station 44. If the articles 41 are to be rotated through angles of 180°, the length of each surface 38 (in the circumferential direction of the conveyor 23) equals half the circumferential length m of a filter cigarette 41 of double unit length. The pitch of such conveyor 23 is still smaller than that of the conveyor 21 and/or 24.

Figure 3:
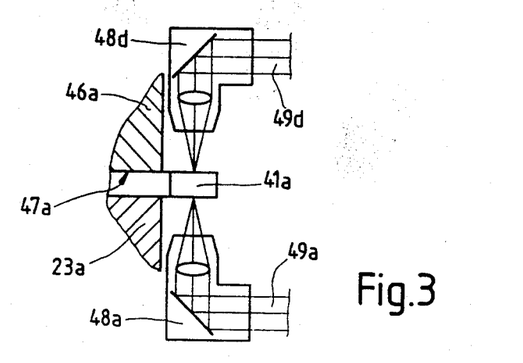
FIG. 3 is a fragmentary partly elevational and partly sectional view of a modified apparatus which is utilized to form perforations in the wrappers of mouthpieces of successive filter cigarettes of unit length.

FIG. 3 shows a further modification wherein the conveyor 23a replaces the conveyor 23 of FIGS. 1, 2 and 4 and is provided with flutes 47a serving to support filter cigarettes 41a of unit length in such a way that the filter mouthpieces of the cigarettes extend beyond one end face of the conveyor 23a. The latter cooperates with a second conveyor 46a replacing the conveyor 46 of FIGS. 1 and 2 so that each cigarette 41a is rotated through an angle of 360/n degrees wherein n is the number of radiation directing heads. FIG. 3 shows two heads 48a, 48d which respectively direct beams 49a, 49d radially of the filter plug of the cigarette 41a at the rolling station and are disposed diametrically opposite each other. In other words, the conveyors 23a, 46a are called upon to rotate each filter cigarette 41a of unit length through an angle of 180°. Thus, one half revolution suffices to ensure that the pulsating beams 49a and 49d can provide the filter plugs of successive filter cigarette 41a with complete annuli of perforations.

An important advantage of all embodiments of the improved apparatus is that the conveyor 23 or 23a can be provided with a larger number of advancing surfaces (such as the surfaces 38 shown in FIG. 2) and that the conveyor 23 or 23a can be rotated at a relatively low speed without necessitating a reduction of the output of the machine in which the apparatus is installed. The number of advancing surfaces can be increased without increasing the diameter of the conveyor 23 or 23a because the pitch of this conveyor is smaller than that of the neighboring conveyors. The peripheral speed of the conveyor 23 or 23a is less than the peripheral speed of the conveyor 21 or 24, and the ratio of such peripheral speeds is a function of the length of advancing surfaces 38 in the circumferential direction of the conveyor 23 or 23a.

As mentioned above, it is desirable to reduce the mechanical stressing of rod-shaped articles in filter tipping and like machines. Such mechanical stressing is greatly reduced if the cigarettes, which are being provided with perforations or the wrappers of which are to be monitored in a manner as shown in FIGS. 2, 3 and 4, need not complete a full revolution but only a small fraction of a revolution, depending on the number of employed or active radiation directing heads. Successive cigarettes can be treated at shorter intervals which not only reduces the mechanical stressing of such articles but also increases the output of the filter tipping machine.

The apparatus of FIG. 4 can employ any suitable sources of electromagnetic radiation, such as infrared light. The number of radiation sources and detectors in each row 59 can be increased or reduced without departing from the spirit of the invention. In many instances, the apparatus 36 will be designed in such a way that the conveyor 23 or 23a will be driven at a relatively low peripheral speed. This, combined with rotation of the articles through less than 360° during treatment at the rolling station 44, even further reduces the likelihood of undue mechanical stressing of the articles on their way from the conveyor 21 toward the conveyor 24. Moreover, such relatively slow angular movement of the conveyor 23 or 23a further reduces the likelihood of unpredictable or unsatisfactory treatment of articles at the rolling station 44, regardless of whether the articles are treated with beams of coherent radiation or with beams of electromagnetic radiation.

Without further analysis, the foregoing will so fully reveal the gist of the present invention that others can, by applying current knowledge, readily adapt it for various applications without omitting features that, from the standpoint of prior art, fairly constitute essential characteristics of the generic and therefore, such adaptations should and are intended to be comprehended within the meaning and range of equivalence of the appended claims.

I claim:

1. Apparatus for radiation treatment of rod-shaped articles of the tobacco processing industry, comprising means for conveying the articles seriatim sideways along a predetermined path; means for decelerating successive articles in a predetermined portion of said path and for rotating the decelerated articles about their respective axes; treating means including n substantially equidistant radiation directing means surrounding said portion of said path and each arranged to focus a beam of radiation upon the rotating decelerated article so that a circumferentially complete portion of the periphery of the article in said portion of said path is acted upon by radiation when such article completes an angular movement through 360/n degrees.

2. The apparatus of claim 1, wherein said decelerating means includes means for interrupting the sidewise movement of articles in said portion of said path.

3. The apparatus of claim 2, wherein said conveying means comprises a first rotary conveyor having peripheral article supporting surfaces, and means for rotating said conveyor to advance said surfaces along said path in a predetermined direction, said decelerating means comprising a second rotary conveyor having peripheral counterrolling surfaces, and means for rotating said second conveyor in said predetermined direction to advance the counterrolling surfaces along a second path having a portion adjacent said portion of said predetermined path so that the articles which advance with successive supporting surfaces along said portion of the predetermined path are acted upon by successive counterrolling surfaces and rotate about their respective axes.

4. The apparatus of claim 1 for treating rod-shaped articles each of which has a predetermined circumferential length m, wherein said conveying means comprises a rotary conveyor having a periphery including a plurality of article supporting surfaces each having a length, in the circumferential direction of said conveyor, which equals or approximates m/n.

5. The apparatus of claim 4, further comprising means for feeding discrete rod-shaped articles to successive supporting surfaces of said conveyor, said feeding means including equidistant article receiving devices and the mutual spacing of said receiving devices exceeding the mutual spacing of articles on said conveyor.

6. The apparatus of claim 5, wherein the ratio of mutual spacing of said receiving devices to the mutual spacing of articles on said conveyor is a function of m/n.

7. The apparatus of claim 4, further comprising means for receiving discrete rod-shaped articles from successive supporting surfaces of said conveyor, said receiving means including equidistant article receiving devices and the mutual spacing of said receiving devices exceeding the mutual spacing of articles on said conveyor.

8. The apparatus of claim 7, wherein the ratio of mutual spacing of said receiving devices to the mutual spacing of articles on said conveyor is a function of m/n.

9. The apparatus of claim 4, further comprising first additional conveying means for feeding discrete rod-shaped articles to successive supporting surfaces ahead of said portion of said path, said feeding means including first equidistant article receiving devices, second additional conveying means for receiving discrete rod-shaped articles from successive supporting surfaces downstream of said portion of said path, said second additional conveying means including second equidistant article receiving devices and the mutual spacing of receiving devices of at least one of said additional conveying means exceeding the mutual spacing of articles on said conveyor, means for driving said conveyor at a first speed, means for driving said one additional conveyor means at a second speed greater than said first speed, and means for driving the other of said additional conveyor means.

10. The apparatus of claim 9, wherein the ratio of said first and second speeds is a function of m/n.

11. The apparatus of claim 1 for treating rod-shaped articles each of which has a tubular wrapper, wherein said treating means further comprises at least one source of coherent radiation and means for effecting propagation of such radiation from said source to said directing means so that the beams of radiation which are directed against the articles in said portion of said path perforate the wrappers of such articles.

12. The apparatus of claim 11, wherein said beams are laser beams.

13. The apparatus of claim 1, further comprising means for feeding articles to said conveying means ahead of said portion of said path and means for receiving rod-shaped articles from said conveying means downstream of said portion of said path, said conveying means, said feeding means and said receiving means constituting component parts of a filter tipping machine.

14. Apparatus for radiation treatment of rod-shaped articles of the tobacco processing industry, comprising means for conveying the articles seriatim sideways along a predetermined path; means for decelerating successive articles in a predetermined portion of said path and for rotating the decelerated articles about their respective axes; treating means including at least two radiation directing means disposed in the region of said portion of said path and each arranged to focus a beam of electromagnetic radiation upon the rotating decelerated article, the radiation being reflected by the articles in said portion of said path, said radiation directing means being spaced apart from each other in the circumferential direction of the article in said portion of said path and said treating means further comprising means for monitoring the characteristics of reflected radiation.

15. The apparatus of claim 14, wherein each of said directing means comprises a battery of sources of electromagnetic radiation and said treating means comprises a battery of monitoring means for each battery of radiation sources.

16. The apparatus of claim 14 for treating rod-shaped articles each of which has a tubular wrapper, wherein the radiation which is reflected by the wrapper of the article which is rotated in said portion of said path is indicative of the condition of such wrapper, said monitoring means including means for generating signals denoting the intensity of reflected radiation and said treating means further comprising means for processing said signals so that the processed signals are indicative of the condition of the respective wrappers.

17. A method of radiation treatment of rod-shaped articles of the tobacco processing industry, particularly in a filter tipping machine, comprising the steps of conveying the articles seriatim sideways along a predetermined path; decelerating successive articles in a predetermined portion of said path including interrupting the sidewise movement of successive articles in said portion of said path, and rotating the decelerated articles about their respective axes; and treating successive articles in said portion of said path, including directing upon the article in said portion of said path n beams of radiation from locations which are at least substantially equidistant from each other in the circumferential direction of the article so that a circumferentially complete portion of the article is acted upon by said n beams when such article completes an angular movement through 360/n degrees.

18. The method of claim 17, further comprising the steps of feeding successive articles into said path ahead of said predetermined portion at a first speed, removing successive articles from said path downstream of said predetermined portion at a second speed, and advancing the articles along said path toward and away from said predetermined portion at third speed less than at least one of said first and second speeds.

* * * * *